United States Patent [19]

Mitchell et al.

[11] 4,130,302

[45] Dec. 19, 1978

[54] TWIN POSITIVE AND NEGATIVE SEAL PIPE FITTINGS

[75] Inventors: Wylie W. Mitchell, Snellville; Gordon W. Arrowood, Palmetto, both of Ga.

[73] Assignees: Clyde A. Robdell; Leonard B. Rodbell; Paul N. Rodbell; Sidney P. Rodbell; Arthur T. Rodbell, all of Atlanta, Ga. ; a part interest to each

[21] Appl. No.: 816,909

[22] Filed: Jul. 18, 1977

[51] Int. Cl.² .............................................. F16L 13/14
[52] U.S. Cl. ................................ 285/113; 285/156; 285/351; 285/382.2
[58] Field of Search ...................... 285/351, 113, 382.2, 285/382.1, 382, DIG. 19, 231, 230, 345, 156; 277/207 A, 58

[56] References Cited

U.S. PATENT DOCUMENTS

| 1,861,755 | 6/1932 | Rasmussen | 285/113 |
|---|---|---|---|
| 1,869,021 | 7/1932 | Perks | 285/231 X |
| 3,041,077 | 6/1962 | Osterloh et al. | 285/113 X |
| 3,244,441 | 4/1966 | Caudle | 285/382 X |
| 3,429,587 | 2/1969 | Kish | 285/382.2 X |
| 3,596,939 | 8/1971 | Gibson | 285/382.2 |
| 3,600,010 | 8/1971 | Downs | 285/351 |
| 4,055,359 | 10/1977 | McWethy | 285/351 X |

FOREIGN PATENT DOCUMENTS

| 2203382 | 8/1973 | Fed. Rep. of Germany | 277/207 A |
| 2424353 | 12/1975 | Fed. Rep. of Germany | 285/382.2 |
| 62276 | 6/1968 | German Democratic Rep. | 285/113 |

Primary Examiner—Thomas F. Callaghan
Attorney, Agent, or Firm—Clarence A. O'Brien; Harvey B. Jacobson

[57] ABSTRACT

The invention provides a seal for pipe joint couplings, the present seal comprising a sleeve member receivable over the pipe joint and extending for a relatively short distance along each of the pipes. The seal further comprises an annular pressure chamber formed in the inner wall of the sleeve facing each of the pipes, the outer surface of each pipe acting to define the chamber, each pressure chamber being partially positioned into two sub-chambers by an inwardly extending annular bead formed on the sleeve, the sub-chambers each having packings such as O-rings disposed therein.

1 Claim, 3 Drawing Figures

TWIN POSITIVE AND NEGATIVE SEAL PIPE FITTINGS

BACKGROUND AND SUMMARY OF THE INVENTION

Couplings for sealingly joining the ends of two pipes are known in the art. Certain of these couplings, such as are disclosed by Magnani in U.S. Pat. No. 2,829,909, provide a sleeve fitted over the ends of the pipes, O-rings being provided between grooves in the inner surface of the sleeve and the external surface of the pipe to form a seal therebetween. The Magnani structure includes a plurality of longitudinally spaced O-rings engaging each of the pipes coupled by the sleeve. Straight-walled grooves fix the O-rings in the Magnani structure in a positive position, the Magnani structure being dependent for operation on the friction generated when the pipes are forced through the O-rings on assembly.

The present structure provides a seal coupling comprised of a sleeve mounted on the spaced ends of the coupled pipes, O-ring receiving pressure chambers being formed between the external surface of each pipe and the interior surface of a peripheral ridge formed in the sleeve. The O-ring receiving pressure chambers are essentially partitioned partially into two sub-chambers by an inwardly extending annular bead, the bead being located medially of the inner surface of each of the pressure chambers and extending toward but not into contact with the external surface of each pipe. The pressure chamber of the present seal allows the O-rings received within each chamber, one O-ring being disposed on each side of the annular bead, to travel when pressure thereon becomes a driving force. The present seal can therefore adjust to irregular or rough surfaces.

Accordingly, it is an object of the invention to provide a sleeve coupling for joining the spaced or contiguous ends of pipes, the sleeve having peripheral grooved ridges formed therein which define annular pressure chambers with the facing exterior surface of the concentrically enclosed pipe, the annular pressure chambers being partially partitioned by an inwardly extending annular bead formed on the inner surface of the sleeve, one O-ring being disposed on each side of the annular bead within each pressure chamber, the seal allowing travel of the O-rings on application of sufficient pressure to adjust the fit of the seal to irregular or rough surfaces.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
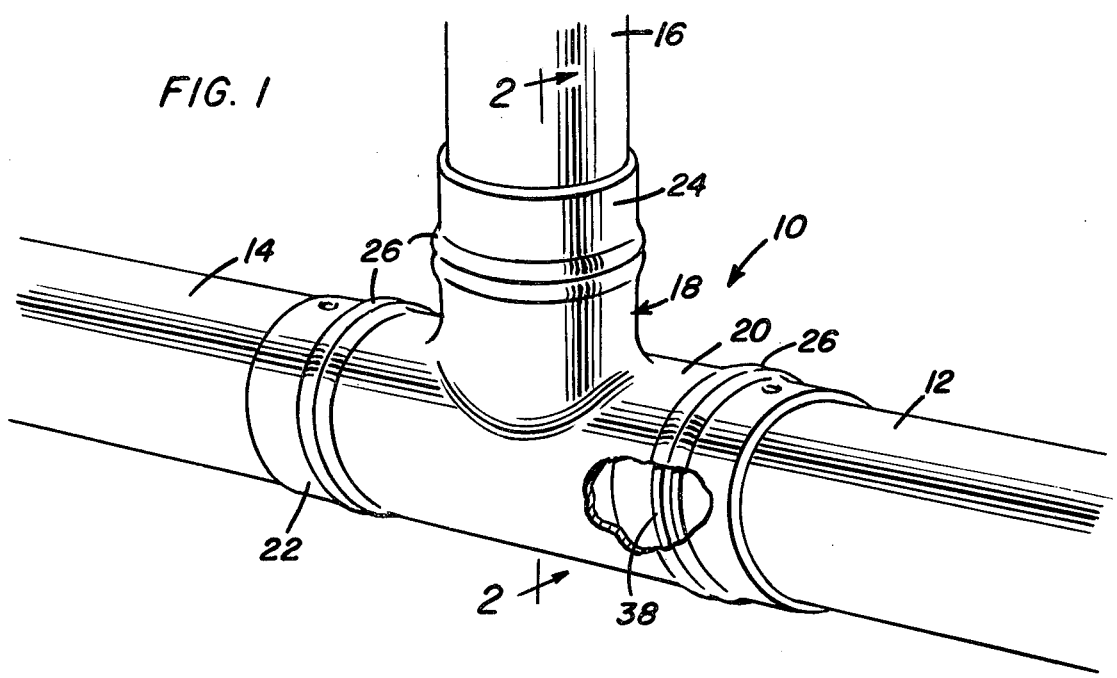
FIG. 1 is a perspective view illustrating the use of the present seal in a T-coupling.
Figure 2:
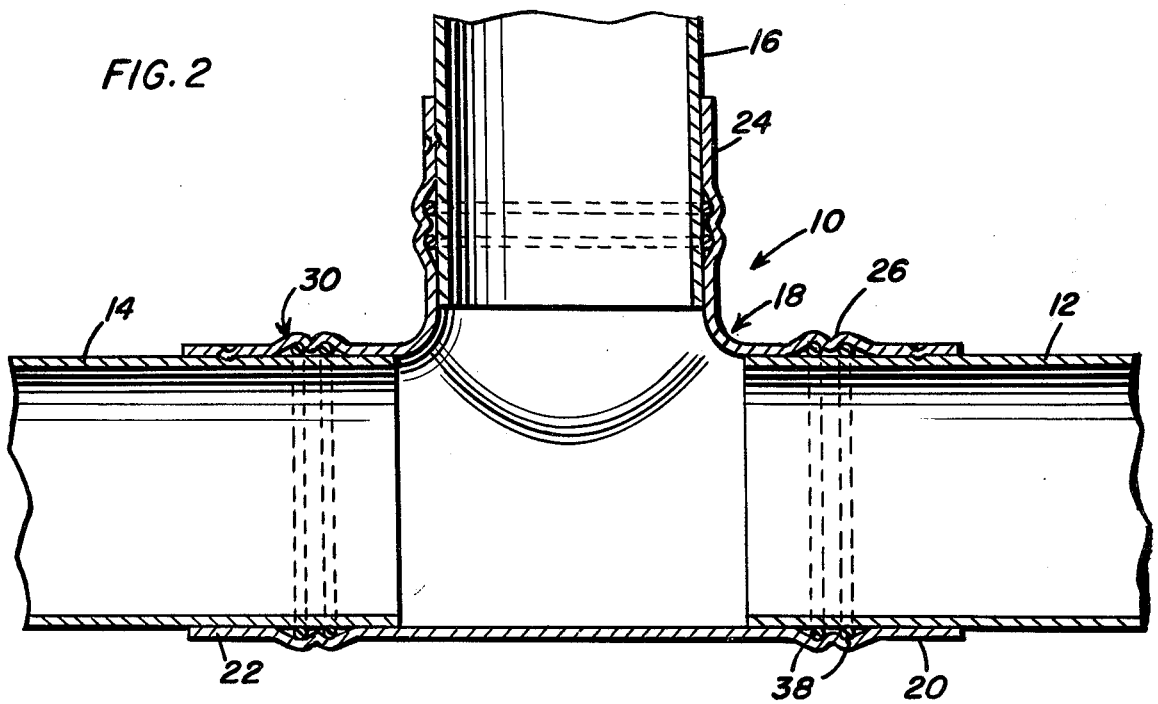
FIG. 2 is a sectional view taken along line 2—2 of FIG. 1.
Figure 3:
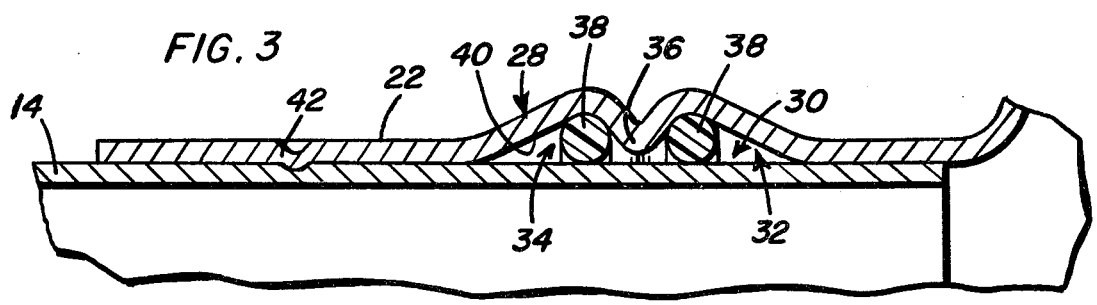
FIG. 3 is a detail sectional view of a portion of the seal.

Referring to the drawings, a T-joint seal 10 is seen to connect pipes 12, 14 and 16, the longitudinal axes of the pipes 12 and 14 being essentially aligned while the longitudinal axis of the pipe 16 is disposed perpendicularly to the longitudinal axes of the pipes 12 and 14. While the invention will be described herein relative to a T-joint, it is to be understood that other fittings and couplings are equally capable of use with the present invention, such couplings including but not being limited to "ell" joints of varying angles, aligned pipes, valves, etc. The seal 10 is seen to comprise a sleeve 18 which, for the T-joint seal, is formed of a T-shape, aligned arms 20 and 22 of the sleeve 18 receiving the ends of the aligned pipes 12 and 14 thereinto, the ends of the pipes 12 and 14 being spaced apart in the T-connection shown. Leg 24 of the sleeve 18 receives the end of the pipe 16 therewithin, the pipes 12, 14 and 16 being slidably received within the sleeve 18.

Peripheral ridges 26 are formed in the arms 20, 22 and in the leg 24 of the sleeve 18, the ridges 26 essentially defining annular grooves 28 which are bounded by the peripheral external surfaces of each of the pipes to define pressure chambers 30. The pressure chambers 30 are essentially partially partitioned into inner and outer sub-chambers 32 and 34 by an inwardly extending annular bead 36 formed on the inner surface of the ridge 26. Packings such as O-rings 38 fit one each within each of the sub-chambers 32 and 34, the O-rings 38 contacting the outer wall surfaces of the pressure chambers 30 and the external surface of the respective pipes.

Inner wall surfaces 40 of each pressure chamber 30 taper outwardly from the external surfaces of the pipes to provide a wedging effect to the seal formed on each of the pipes. The O-rings 38 are thereby allowed to travel upon subjection of sufficient pressure to permit adjustment to irregular surfaces. The annular bead 36 tapers inwardly toward but does not touch the external surface of the pipe, the bead 36 recurving to taper outwardly to partially define the outer sub-chamber 34. Twin positive and negative seals are thus formed by the two O-rings 38 within each pressure chamber 30, indentations 42 or crimps being formed in the sleeve 18 and pipes to secure said sleeve to said pipes. The sleeve 18 can essentially be disposed on any portion of the pipes and secured thereto. A vacuum seal is substantially formed by the combination of the O-rings 38, the vacuum seal having a wedging effect, the inner O-rings 38 essentially forming the positive pressure portion of the seal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A seal for coupling the ends of pipes together comprising:

a sleeve having openings concentrically receiving an end of each pipe into one of said openings;

a peripheral ridge formed in the sleeve in concentrically surmounting relation to each pipe received within said sleeve, said peripheral ridge having four walls with the walls being of substantially constant cross sectional area and wherein the first and second walls slope outwardly at an angle from the external surface of the pipe and extend toward each other, the third and fourth walls being connected at an angle respectively to said first and second walls and form a continuous curved connection therewith, said third and fourth walls extending toward each other and extending toward the external surface of the pipe and being connected in a continuous curved surface to each other thus forming an annular bead, said bead being in spaced relation to the pipe;

said four walls thereby forming a single pressure chamber with the pressure chamber being partially partitioned into two sub-chambers by said annular bead extending toward and ending in a spaced relation to said pipe;

an O-ring packing member disposed in each sub-chamber, the packing members contacting respectively the curved connection between the first and third walls and the curved connection between the second and fourth walls, and contacting the external surface of the pipe, the O-rings thus forming twin positive and negative seals with both O-rings actively sealing at the same time; and indentation means formed in the sleeve and in each pipe for securing the sleeve to the pipe.

* * * * *